Feb. 5, 1963  A. L. EAMES  3,076,745
ANTIBIOTIC METHOD FOR PROMOTING POULTRY GROWTH
Filed Nov. 17, 1958

INVENTOR.
ARVID LEE EAMES
BY Jerome A. Gross,
ATTORNEY

3,076,745
ANTIBIOTIC METHOD FOR PROMOTING POULTRY GROWTH

Arvid Lee Eames, Cedar Hill, Mo., assignor to Poultry Service and Research Corporation, a corporation of Missouri
Filed Nov. 17, 1958, Ser. No. 774,427
2 Claims. (Cl. 167—53.1)

The present invention relates to the use of antibiotics in poultry raising. Its purposes include: promoting the growth, strength, stature, weight and conformation, and bettering the feed conversion ratios of chicks, particularly those raised as broilers.

These purposes have, to a substantial extent, been served heretofore by feeding antibiotics such as are now commonly included in feed concentrates. I have discovered that somewhat similar results to those which follow from feeding antibiotics, can be obtained at little cost, and such feeding may advantageously be supplemented, by the use of antibiotic atmospheres circulated among young chicks, preferably those which are "day-old," that is newly hatched and prior to their transfer from hatcheries to feeding stations.

The present method involves the use of apparatus which may be conveniently located at the hatcheries, said apparatus being of the type heretofore used for a quite different purpose—the administration of live virus vaccines to chicks through their respiratory organs. Well suited for this new purpose is the vaccination apparatus described in my co-pending application Serial No. 703,904, filed December 19, 1957, now U.S. Patent No. 2,984,240, entitled "Apparatus for Vapor Immunization of Fowls"; and to the extent that the present invention includes a new use for such apparatus, this application is to be considered a continuation in part of said pending application.

In the present invention, a solution of antibiotic materials, more particularly described hereafter, is atomized in dehydrated, filtered air, and is circuated as an atmosphere about day-old chicks, and by them inspired into their lungs and air sacs. In contrast to the daily administration of antibioitic feed supplements, the present antibiotic material is apparently stored up within these organs of respiration. Apparently it is utilized by the chick from its day-old condition through to broiler age in a manner which has much in common with the manner in which antibiotics serve as dietary supplements. Thus I have found that chicks treated as herein described get off to a better start, gain weight, strength and stature faster, and will be ready for sale as broilers at an earlier age, and with an improved feed conversion ratio.

The store of antibiotic material so inspired into the air sacs and lungs of the chicks is conveniently in the form of atomized particles of antibioitic material in a saline solution including glycerin. The adherency of glycerin to the membranes within the lungs and air sacs appears to have a favorable effect upon the internal storage of antibiotic substances. Furthermore, a certain portion of the antibiotic material in glycerin apparently adheres to the down of the chicks and may be later inhaled by them. Conceivably such stored or later inhaled material is gradually communicated to the gastro-intestinal tract; this would be one explanation for the general similarity with the results of antibiotic feeding. However the present method is inherently economical, whereas to enrich feeds with a high level of antibiotic material may be quite expensive.

A suitable example of the solution utilized in the present invention consists of a dry mixture containing ten percent potassium penicillin G and ninety percent dihydro streptomycin sulphate. Two grams of such dry mixture may be dissolved in twenty cubic centimeters of a ten percent glycerin, ninety percent saline solution.

Such a solution may be administered by atomizing it in filtered dehydrated air at room temperature of say eighty degrees, the solution being dispensed in atomized form at the rate of approximately seventy-five cubic centimeters per hour, into a respiratory treatment cabinet containing approximately fifty cubic feet in which a thousand baby chicks may be accommodated in ventilated trays. The apparatus described in my said patent application includes the mechanism and cabinet necessary for this purpose; it is re-described below.

Utilizing such antibiotic mixture in such concentration, the treatment may be effectively continued for eight minutes, more or less. It will be understood that the specific solution mentioned is exemplary of the types of solutions and their ingredients which are suitable for the purpose; and the concentration, rate of dispensing, time of exposure and other pertinent factors are to some extent mutually interdependent upon each other, so that changes made in one such factor may substantially affect the others.

Thus, with more concentrated solutions dispensed at a greater relative rate or to provide more concentrated vapors, exposure of the chicks may be cut as low as approximately two minutes or with lower concentrations of vapors, exposures may be increased to approximately fifteen minutes.

THE APPARATUS

Figure 2:
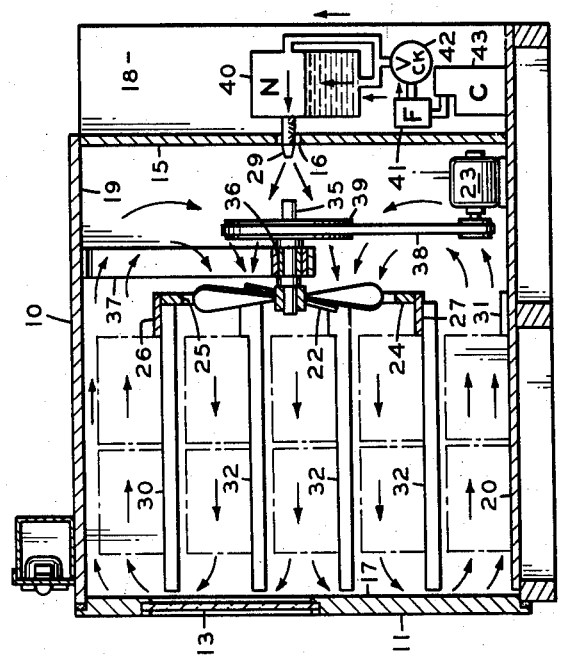
FIGURE 2 is a side view of the same cabinet in section, taken along line 2—2 of FIGURE 1, with ten of such standard trays shown therein in dotted lines, and with arrows illustrating the pattern of circulation of vapors.
Figure 1:
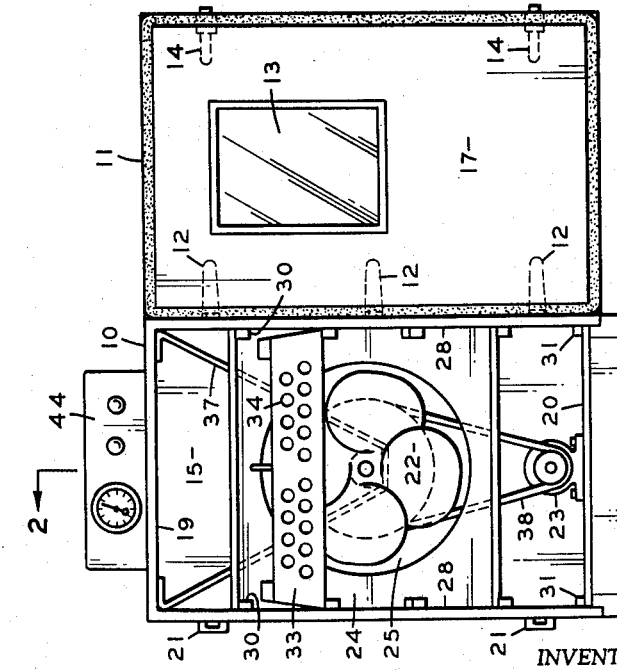
FIGURE 1 is a front elevational view of a cabinet embodying the present invention showing one standard ventilated poultry chick tray therein.

The cabinet illustrated in FIGURES 1 and 2 comprises a rectangular sealed chamber generally designated 10 including a door 11 mounted on hinges 12 and having a window 13 and latch handles 14. Said chamber further includes an inlet vertical wall 15 having an inlet opening 16 centrally disposed therein. Opposite the inlet vertical wall 15 is a substantially smooth-surfaced vertical deflector wall 17. In the particular embodiment shown the door 11 is opposite the inlet vertical wall 15, and thus the inner surface of the door 11 constitutes the vertical deflector wall 17. Connecting the inlet vertical wall 15 and the opposite deflector wall 17 are a pair of vertical walls 18, a top wall 19 and a bottom wall 20. In the particular embodiment shown, with the door 11 opposite the inlet vertical wall 15, the hinges 12 are mounted on one of said connecting vertical walls 18 and catches 21 are mounted on the opposite wall 18, thus permitting the door 11 to be sealed by engagement of the latch handle 14 with the catches 21.

Disposed within said chamber 10 is a rotating-blade circulating fan 22 spacedly adjacent the inlet opening 16 and concentrically located with respect to said opening. The fan 22 is mounted on a shaft 35 which is in turn mounted rotatably within a bushing 36 supported from the top wall 19 by a V-shaped bracket 37. Said fan 22 is so disposed that the direction of its thrust is generally perpendicularly away from the inlet vertical wall 15, and perpendicularly toward the deflector wall 17. The fan 22 is rotated by a belt 38 which turns a sheave 39 secured to the shaft 35. The belt 38 is driven by an electric motor 23, supplied by a power source not shown.

Mounted within the chamber 10 by its side edges is a baffle plate 24 having a central circular opening 25 within which the fan 22 is located. Said baffle plate 24 also includes an upper edge 26 spaced downwardly from the top wall 19 of the chamber 10, and a pair of outer side edges 28 abutting the connecting vertical walls 18. Said baffle surrounds the fan 22, is substantially concentric therewith, and may be substantially within the plane of said fan.

The source of vapor to be circulated within the chamber 10 by the fan 22 includes a nozzle 29 sealingly fitted within the inlet opening 16 and communicating between said chamber 10, and a nebulizer 40 disposed outside said chamber 10. Also disposed outside the chamber 10 is an air filter 41 communicating with the nebulizer 40, a check valve 42 being disposed therebetween, which filter contains dehydrating soda crystals, not shown; also a compressor 43 communicating with the filter 41.

Affixed within the chamber 10 are upper support means or tray holders, which are shown in the particular embodiment as upper brackets 30, for supporting a plurality of ventilated poultry trays above the upper edge 26 of the baffle plate 24, and lower support means or tray holders which are shown in the particular embodiment as lower brackets 31 for supporting a plurality of these poultry trays below the lower edge 27 of the baffle plate 24. Intermediate said upper brackets 30 and lower brackets 31 are a plurality of intermediate support means or tray holders, which are shown in the particular embodiment as intermediate brackets 32, for supporting a plurality of poultry trays substantially at the level of the fan 22. Whether one, two, three or more intermediate tray support means are used will determine the diameter of the fan 22 which is most suitable.

Tray support brackets 30, 31 and 32 are secured along the side walls 18 so as to support such ventilated trays adjacent the plane of rotation of the blades of the fan 22 and spacedly from the deflector wall 17.

The particular embodiment shown in FIGURES 1 and 2 has been designed for use with two columns of five standard ventilated poultry chick trays such as the poultry tray 33 shown in FIGURE 1. Such standard poultry trays are normally perforated with large ventilating openings 34 on two sides; however, this invention may be used for any ventilated tray or container suitable for holding the chicks and which may be presented to permit therethrough the circulation of air as shown by the arrows in FIGURE 2.

Mounted on top wall 19, outside the chamber 10, is a central panel 44 whereby to control the introduction of vapor into the chamber 10, the rotation of the fan 22, the time of exposure, and to record and/or control temperature and humidity.

Treatment of chicks in this apparatus is accomplished by placing said chicks in suitable ventilated trays, such as the poultry chick tray 33; placing such trays within the chamber 10 on support means such as the brackets 30, 31 and 32, and arranging such trays as shown in FIGURE 2 so that the ventilation openings in said trays are opposite said fan and said deflector wall; closing and sealing the door 11. The compressor 43 is then activated, forcing air through the filter 41 into the nebulizer 40, which nebulizes a fluid contained therein. This is preferably the di-hydro streptomycin sulfate and potassium penicillin G solution in glycerin and saline previously described.

The resultant vapor is then forced by the compressor 43 through the nozzle 29 and the inlet opening 16 into the chamber 10. The fan 22 then propels such vapor through the circular opening 25 of the baffle plate 24 and thrusts it forward through the ventilating openings of the trays 33 supported by the intermediate brackets 32. The perforations 34 in the walls of the trays 33 render them partial baffles for the vapor, causing part of it to circulate within the individual trays 33 while another part passes through the openings 34. After such vapor passes through such intermediate trays it is deflected by the deflector wall 17 substantially perpendicularly upward and downward, in roughly equal quantities, and thence circulates back through the ventilated trays 33, supported by the upper brackets 30 and lower brackets 31; thence above and below the baffle plate upper edge 26 and lower edge 27 respectively and back into the exhaust area of the fan 22. Here the air combines with a fresh supply of vapor and then repeats the same pattern of circulation.

TEST RESULTS

In the following three examples of laboratory tests (using low-calorie diets) day-old chicks were separated into pens as noted, ten birds to a pen; and each pen of chicks was exposed to vapors of the substances mentioned. The chicks were then raised under laboratory conditions for eight weeks. (The term "strep-pen" refers to di-hydro streptomycin sulphate in combination with potassium penicillin G. The 10% glycerin, 90% saline carrier was used in all cases; the dry ingredients being dissolved at the rate of 28 per 20 cc.)

*Example 1.—Choice of Antibiotic*

| Pen No. | Treatment | Average weight attained | Feed conversion rate |
|---|---|---|---|
| 1 | Erythomycin and Vaccine | 2.61 | 2.37 |
| 2 | Erthomycin, terramycin and vaccine | 2.56 | 2.32 |
| 3 | Terramycin and vaccine | 2.48 | 2.44 |
| 4 | Strep-pen and vaccine | 2.69 | 2.28 |
| 5 | Vaccine only | 2.62 | 2.36 |
| 6 | Control | 2.40 | 2.77 |

*Conclusion.*—Each antibiotic listed showed favorable results on weight attained and feed conversion rate; with strep-pen showing the greatest advantages.

*Example 2.—Concentrating Solution*

| Pen No. | Treatment | Average weight attained | Feed conversion rate |
|---|---|---|---|
| 1 | Strep-pen, 2 gm. per 20 cc | 2.72 | 2.24 |
| 2 | Strep-pen 8 gm. per 20 cc | 2.66 | 2.30 |
| 3 | Control | 2.69 | 2.30 |

*Conclusion.*—The concentration of 2 parts strep-pen in 20 parts of the glycerin-and-saline diluent gave favorable results as compared with the control. However when the concentration of strep-pen in diluent reached 8 grams to 20 cc., no advantage was apparent in the respects tabulated.

*Example 3.—Time of Exposure (Using Strep-Pen 2 x 20 Concentration)*

| Pen No. | Time of exposure | Average weight attained | Feed conversion rate |
|---|---|---|---|
| 1 | 1 minute | 2.61 | 2.39 |
| 2 | 2 minutes | 2.59 | 2.27 |
| 3 | 8 minutes | 2.76 | 2.25 |
| 4 | 16 minutes | 2.56 | 2.21 |
| 5 | Control | 2.65 | 2.34 |

*Conclusion.*—For the 8-minute exposure, significantly better weights and feed conversion ratios were attained. For other exposure, either the feed conversion rate, or the weight attained, or both, appeared to be less favorable.

The following field test by a commercial chick raiser, using a commercial, high calorie diet, showed the following results:

*Example 4.—Broiler Production*

|  | Weight attained | Feed conversion rate |
|---|---|---|
| 4,500 test chicks were exposed in the apparatus described to vapors of 2 x 20 strep-pen and vaccine for 8 minutes; then "field raised" under commercial conditions on ordinary high-calorie diet feed for 9 weeks | 3.98 | 2.07 |
| 4,500 control chicks, exposed to vaccine only, were raised simultaneously under identical conditions | 3.58 | 2.27 |

*Conclusion.*—With high calorie feed, such as is commercially used, the laboratory-predicted advantages are fully attained.

Variations and modifications in the method and manner and kind of treatment, the specific ingredient elements, the details and apparatus used, the preparation of solution for use in such apparatus, may obviously be made without departing from the present invention, whose scope is coextensive with the claims which follow.

In the claims: The word "vapors" includes atomized or nebulized fluid particles in an atmosphere. The word "atomized" includes "nebulized."

The terms "day-old chicks" and "newly-hatched chicks" are not specifically limited as to time, but include chicks from the time of hatching to the age when commercial feeding is commenced.

I claim:

1. A process for bettering the growth and feed conversion rate of newly-hatched chicks comprising the steps of placing within a vapor chamber healthy newly-hatched chicks prior to their first feeding, forcing into the chamber the vapor of an atomized fluid containing an active ingredient mixture of antibiotics comprising di-hydro streptomcycin sulfate and potassium penicillin G in diluent solution with glycerine and saline, the ratio of active ingredient sto diluent being less than 8 grams active ingredient to 20 cc. diluent, and circulating the vapor within the chamber for inhalation by the chicks.

2. The process recited in claim 1 further comprising continuing the circulation until the mixture adheres to the membranes in the respiratory organs and enhances storage of the antibiotic within the chicks.

References Cited in the file of this patent

UNITED STATES PATENTS

| 2,594,296 | Dautrebande | Apr. 29, 1952 |
| 2,649,918 | Miller | Aug. 25, 1953 |
| 2,734,482 | Seltzer | Feb. 14, 1956 |
| 2,798,835 | Markham et al. | July 9, 1957 |
| 2,798,836 | Bird et al. | July 9, 1957 |
| 2,802,772 | Elder | Aug. 13, 1957 |
| 2,847,993 | Woodruff | Aug. 19, 1958 |
| 2,861,024 | Silver | Nov. 18, 1958 |
| 2,890,980 | Hotchkiss et al. | June 16, 1959 |
| 2,959,325 | Beard | Nov. 8, 1960 |
| 2,987,439 | Wittlinger | June 6, 1961 |
| 2,989,437 | Wruble et al. | June 20, 1961 |
| 3,014,844 | Thiel et al. | Dec. 26, 1961 |

OTHER REFERENCES

Cover et al.: "Antibiotic Levels in the Serum and Tissues of Chickens Following Various Therapeutic Dosages," Poultry Science, vol. 36, pp. 993–999 (1957).

Abramson: "The Role of Particle Size in Inhalation Therapy by Atomization and by Penicillin Dusts," Diseases of the Chest, vol. 18, pp. 435–449 November 1950.